US012305530B2

(12) United States Patent
Banhos et al.

(10) Patent No.: US 12,305,530 B2
(45) Date of Patent: May 20, 2025

(54) AIRFOIL WITH VENTURI TUBE

(71) Applicant: RTX CORPORATION, Farmington, CT (US)

(72) Inventors: Jonas Banhos, West Hartford, CT (US); James T. Roach, Vernon, CT (US); Cheng Gao, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/414,578

(22) Filed: Jan. 17, 2024

(65) Prior Publication Data

US 2024/0200457 A1 Jun. 20, 2024

Related U.S. Application Data

(62) Division of application No. 17/970,917, filed on Oct. 21, 2022, now Pat. No. 11,905,847.

(51) Int. Cl.

| | |
|---|---|
| ***F01D 5/14*** | (2006.01) |
| ***F01D 5/18*** | (2006.01) |
| ***F01D 5/28*** | (2006.01) |
| ***F01D 9/04*** | (2006.01) |

(52) U.S. Cl.
CPC ............... *F01D 5/147* (2013.01); *F01D 5/18* (2013.01); *F01D 5/282* (2013.01); *F01D 9/041* (2013.01); *F05D 2220/32* (2013.01); *F05D 2230/20* (2013.01); *F05D 2240/12* (2013.01); *F05D 2240/30* (2013.01); *F05D 2300/603* (2013.01)

(58) Field of Classification Search
CPC ............. F01D 5/147; F01D 5/18; F01D 5/282
See application file for complete search history.

(56) References Cited

U.S. PATENT DOCUMENTS

| | | | | |
|---|---|---|---|---|
| 4,594,761 | A * | 6/1986 | Murphy | F01D 5/282 29/418 |
| 7,104,756 | B2 | 9/2006 | Harding et al. | |
| 7,824,152 | B2 | 11/2010 | Morrison | |
| 9,403,208 | B2 | 8/2016 | Propheter-Hinckley | |
| 9,523,283 | B2 | 12/2016 | Uechi et al. | |
| 9,890,644 | B2 | 2/2018 | Tran et al. | |

(Continued)

OTHER PUBLICATIONS

European Search Report for European Patent Application No. 23205204.3 mailed Mar. 26, 2024.

*Primary Examiner* — Michael L Sehn
(74) *Attorney, Agent, or Firm* — Carlson, Gaskey & Olds, P.C.

(57) ABSTRACT

A method includes forming an airfoil, where the airfoil includes an airfoil wall that has a span between first and second radial ends and defines leading and trailing edges, pressure and suction sides each join the leading and trailing edges, and an internal cavity, the internal cavity is divided into at least first and second sub-cavities that extend over the span, and the first sub-cavity defines a venturi tube. The forming includes i) fabricating a fiber preform of the airfoil around a plurality of mandrels, wherein the mandrel in the first sub-cavity is radially split, and ii) densifying the fiber preform with a ceramic matrix. The airfoil may include an internal cavity that is divided into at least first and second sub-cavities extending over the span, where the first sub-cavity defines a venturi tube.

5 Claims, 5 Drawing Sheets

(56) References Cited

U.S. PATENT DOCUMENTS

| | | | |
|---|---|---|---|
| 11,365,635 B2 | 6/2022 | Read et al. | |
| 11,377,964 B2 | 7/2022 | Arisi et al. | |
| 2008/0226461 A1 | 9/2008 | Beeck et al. | |
| 2013/0315725 A1 | 11/2013 | Uechi et al. | |
| 2021/0381384 A1* | 12/2021 | Barker | B29C 70/32 |
| 2021/0402465 A1 | 12/2021 | Propheter-Hinckley | |

* cited by examiner

AIRFOIL WITH VENTURI TUBE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A method according to an example of the present disclosure includes forming an airfoil. The airfoil has an airfoil wall that has a span between first and second radial ends and defines leading and trailing edges, pressure and suction sides each join the leading and trailing edges, and an internal cavity. The internal cavity is divided into at least first and second sub-cavities that extend over the span, and the first sub-cavity defines a venturi tube. The forming includes i) fabricating a fiber preform of the airfoil around a plurality of mandrels, wherein the mandrel in the first sub-cavity is radially split, and ii) densifying the fiber preform with a ceramic matrix.

In a further embodiment of any of the foregoing embodiments, the forming includes using a support shim in the first sub-cavity during densification to prevent collapse of the airfoil wall around the first sub-cavity.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
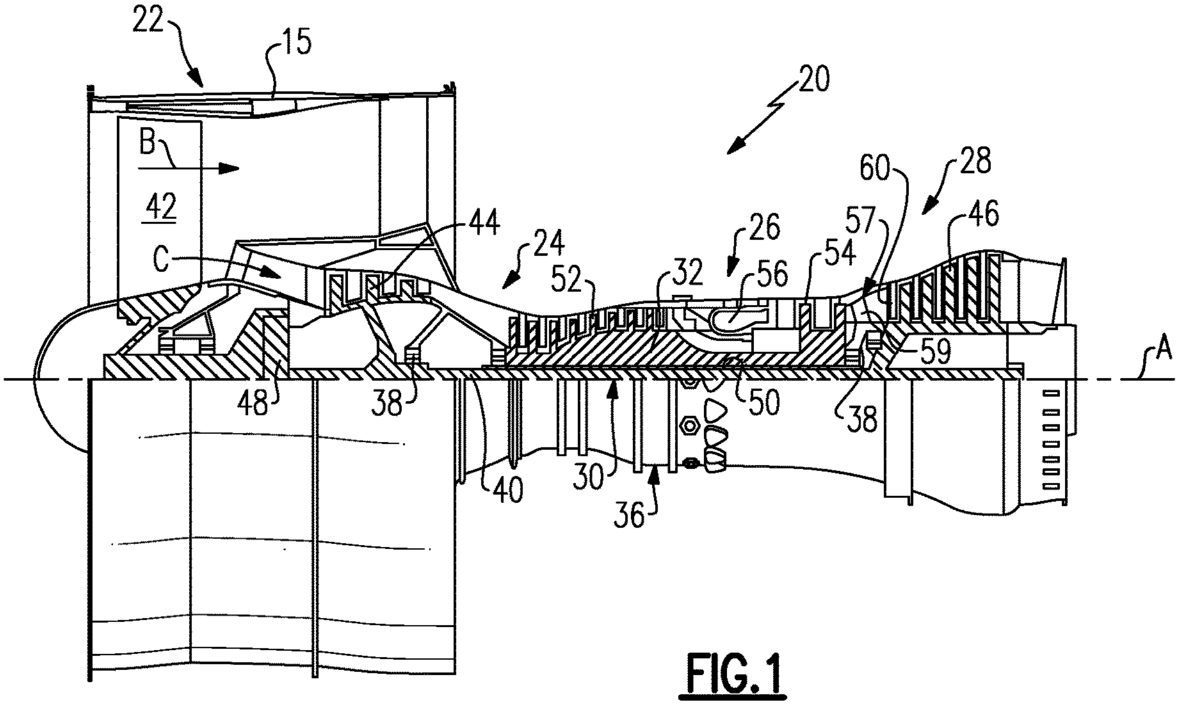
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. The engine parameters described above and those in this paragraph are measured at this condition unless otherwise specified. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45, or more narrowly greater than or equal to 1.25. “Low corrected fan tip speed” is the actual fan tip speed in ft/sec divided by an industry standard temperature correction of $[(\text{Tram } ^\circ \text{R})/(518.7^\circ \text{R})]^{0.5}$. The “Low corrected fan tip speed” as disclosed herein according to one non-limiting embodiment is less than about 1150.0 ft/second (350.5 meters/second), and can be greater than or equal to 1000.0 ft/second (304.8 meters/second).

Figure 2:
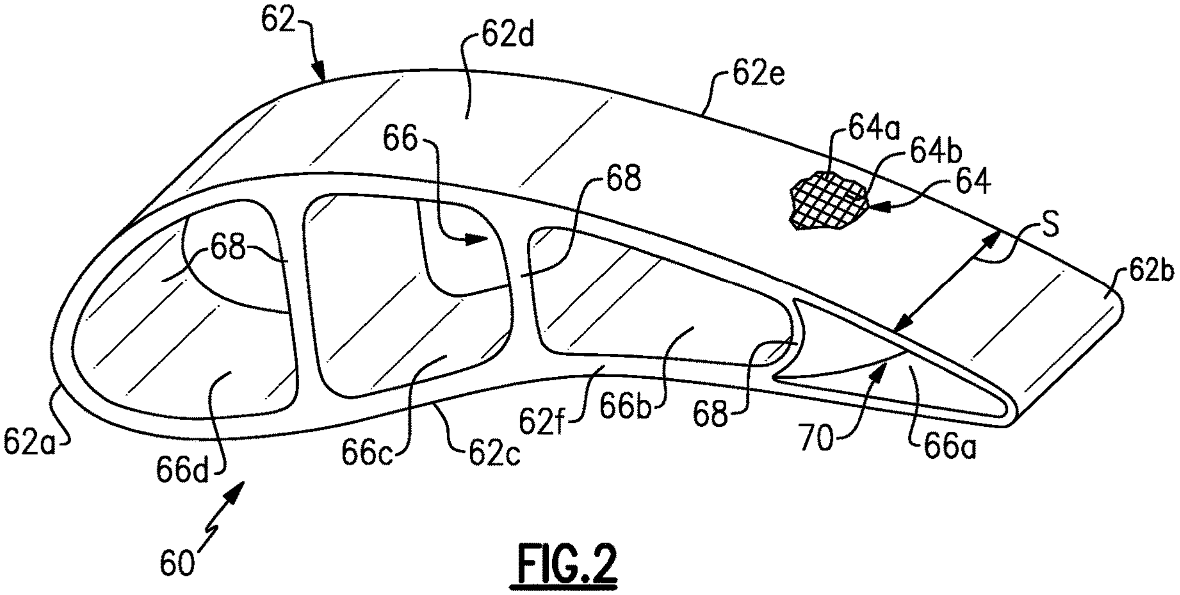
FIG. 2 illustrates an airfoil with a venturi tube of a chordal configuration.

FIG. 2 illustrates selected portions of an airfoil 60 from the turbine section 28 of the engine 20 (see also FIG. 1). For example, the airfoil 60 may be in a static vane or a rotatable blade. The airfoil 60 includes an airfoil wall 62 that defines a leading edge 62*a*, a trailing edge 62*b*, and first and second sides 62*c*/62*d* that join the leading edge 62*a* and the trailing edge 62*b*. In this example, the first side 62*c* is a pressure side and the second side 62*d* is a suction side. The airfoil section 62 generally extends in a radial direction relative to the central engine axis A and spans from a first radial end 62*e* to a second radial end 62*f*. A platform may be joined with the airfoil 60 at the first radial end 62*e* or the second end 62*f*, or both radial ends 62*e*/62*f* may have platforms. The terminology “first” and “second” as used herein is to differentiate that there are two architecturally distinct components or features. It is to be further understood that the terms “first” and “second” are interchangeable in the embodiments herein in that a first component or feature could alternatively be termed as the second component or feature, and vice versa.

The airfoil 60 has a radial span, S, from the first radial end 62*e* to the second end 62*f*. Positions in the span-wise direction are indicated as a percentage of the full span, from 0% span at the first radial end 62*e* to 100% span at the second radial end. For example, the 50% span would be midway between the radial ends 62*e*/62*f*.

The airfoil wall 62 is formed of a ceramic matrix composite (CMC) 64, shown in a cutaway view in FIG. 2. The CMC 64 is comprised of one or more ceramic fiber plies 64*a* in a ceramic matrix 64*b*. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

The airfoil wall 62 circumscribes an interior cavity 66. One or more ribs 68 of the airfoil wall 62 divide the cavity 66 into sub-cavities 66*a*/66*b*/66*c*/66*d*. In the example shown, there are three ribs 68 that divide the cavity 66 into four sub-cavities 66*a*/66*b*/66*c*/66*d*. The sub-cavity 66*a* is a trailing end cavity, the sub-cavity 66*d* is a leading end cavity, and the sub-cavities 66*b*/66*c* are intermediate cavities. It is to be appreciated that the example airfoil wall 62 is not limited to three ribs 68 and that the airfoil 60 may have one rib, two ribs, or more than three ribs.

Cooling air, such as bleed air from the compressor section 24, is fed to the sub-cavities 66*a*/66*b*/66*c*/66*d* to cool the airfoil 60. Especially in ceramic airfoils, the temperature difference between “hot” and “cold” regions of an airfoil may be 500° C. or more. In general, ceramic materials have significantly lower thermal conductivity than superalloys and do not possess the same strength and ductility characteristics, making them more susceptible to distress from thermal gradients and the thermally induced stresses those cause. The high strength and toughness of superalloys permits resistance to thermal stresses, whereas ceramics by comparison are more prone to distress from thermal stress. Thermal stresses may cause distress at relatively weak locations in ceramic matrix composites, such as interlaminar interfaces between fiber plies where there are no fibers carrying load. Therefore, although high thermal gradients may be tolerated in superalloys, they are undesired in ceramic airfoils and may challenge durability goals.

In general, regions of the trailing edge 62*b* experience some of the highest external temperatures on the airfoil 60. Adjacent regions, however, may be relatively cool and can thus contribute to elevated thermal gradients. In this regard, the airfoil 60 includes a thermal management scheme for increased cooling at the hottest region(s) to facilitate reductions in the thermal gradients. In particular, the trailing end sub-cavity 66*a* defines a venturi tube 70 that is configured to provide increased cooling at a targeted hot location.

Figure 3:
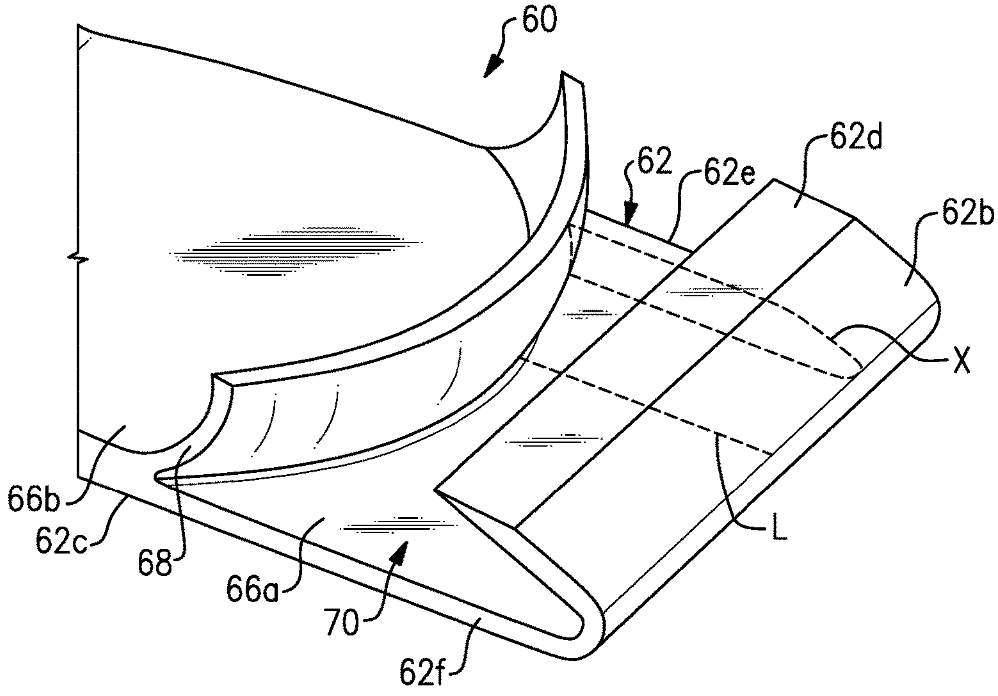
FIG. 3 illustrates the airfoil of FIG. 2 with a portion of the wall removed.

FIG. 3 illustrates the airfoil 60 with a portion of the second side 62*d* of the airfoil wall 62 removed. The forward side of the venturi tube 70 is bound by the rib 68, the aft side is bound by the trailing edge 62$b$, and the lateral sides are bound by the sides 62$c$/62$d$ of the airfoil wall 62. The venturi tube 70 spans from the first radial end 62$e$ to the second radial end 62$f$ and in general has a convergent-divergent shape. For instance, a cross-sectional area (represented at X) of the venturi tube 70 decreases from the first radial end 62$e$ to a location L along the span at which the cross-sectional area is at a minimum. The cross-sectional area X then increases from the location L of the minimum to the second radial end 62$f$. The constriction of the flow of cooling air at the location L of the minimum cross-sectional area causes an increase in the flow velocity at that location. The increase in velocity provides a localized increase in cooling effect. Thus, by coordinating the location L to be at a hot region of the airfoil 60, the hot region is cooled more to thereby facilitate reductions in thermal gradients. The hot location or locations may be determined in a known manner through computerized analysis of an airfoil design. In one example, the location L of the minimum is in a range of 40% to 60% of the span.

There are two basic configurations of the venturi tube 70, including chordal and tangential configurations. In the chordal configuration that is shown in the illustrated example, the venturi tube 70 is constricted in the chordal direction of the airfoil 60. The chordal direction is the direction that is approximately parallel to the chord of the airfoil 60 from the leading edge 62$a$ to the trailing edge 62$b$. In this regard, the venturi tube 70 tapers in the chordal direction along the span from the first radial end 62$e$ to the location L of the minimum, and then expands in the chordal direction along the span from the location L of the minimum to the second radial end 62$f$.

As shown in FIG. 3, the rib 68 has a curvature from the first radial end 62$e$ to the second radial end 62$f$ that is convex in the aft chordal direction. The curvature dictates the taper and expansion of the venturi tube 70 along the span. Thus, the geometry of the venturi tube 70 can be tailored via the degree of curvature to provide a higher or lower minimum constriction and to provide a higher or lower cross-sectional area gradient from the maximum at the radial end 62$e$ to the minimum.

Figure 4:
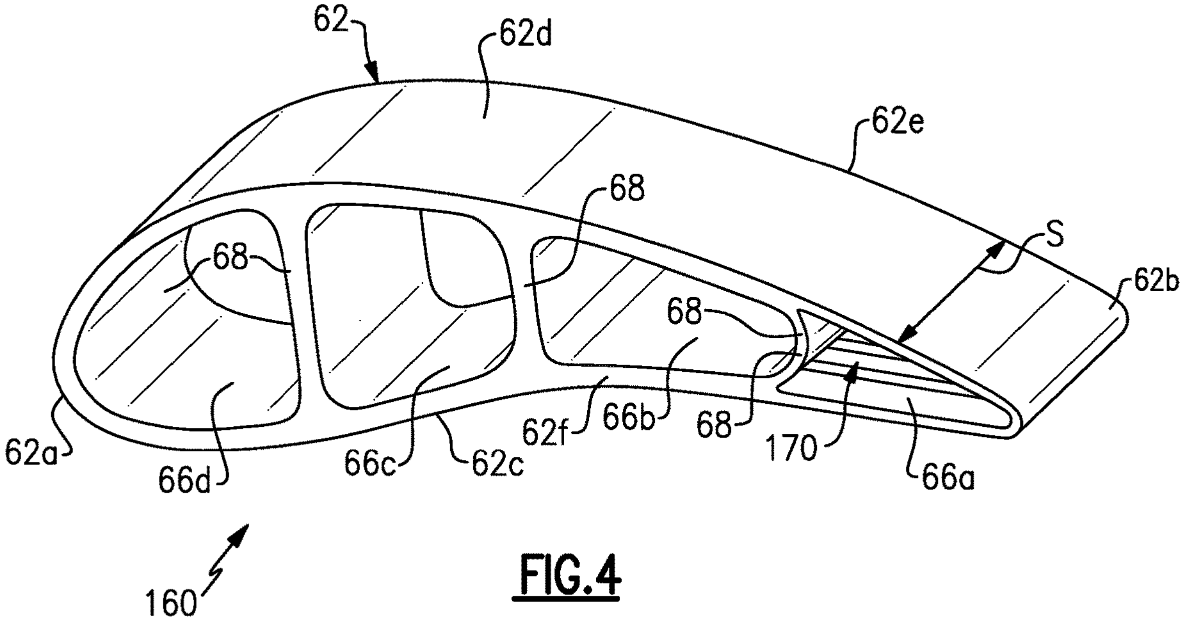
FIG. 4 illustrates an airfoil with a venturi tube of a tangential configuration.
Figure 5:
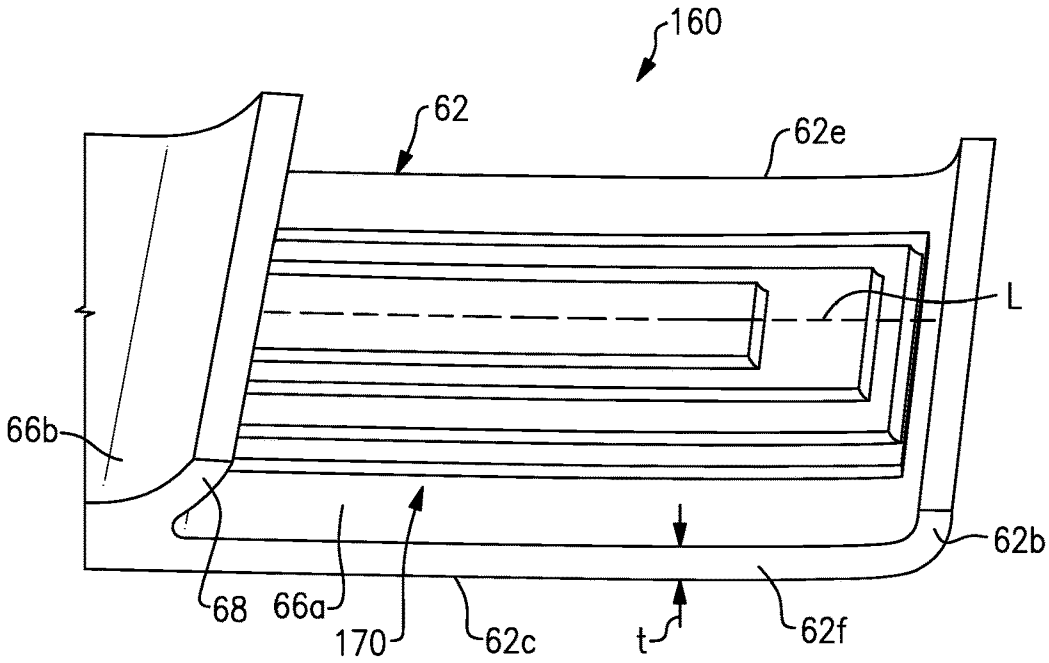
FIG. 5 illustrates the airfoil of FIG. 4 with a portion of the wall removed.

FIG. 4 illustrates an example of the tangential configuration in airfoil 160, in which the venturi tube 170 is constricted in the tangential direction of the airfoil 60. FIG. 5 illustrates the airfoil 160 with a portion of the second side 62$d$ of the airfoil wall 62 removed. The tangential direction is the direction that is approximately parallel to a tangent line of the circumference about the engine axis A through the airfoil 60. In this regard, the venturi tube 70 tapers in the tangential direction along the span from the first radial end 62$e$ to the location L of the minimum, and then expands in the tangential direction along the span from the location L of the minimum to the second radial end 62$f$.

As shown in FIG. 5, the airfoil wall 62 varies in thickness, t, along the span. The thickness dictates the taper and expansion of the venturi tube 170 along the span. Thus, the geometry of the venturi tube 170 can be tailored via the thickness to provide a higher or lower minimum constriction and to provide a higher or lower cross-sectional area gradient from the maximum at the radial end 62$e$ to the minimum. In one example of the venturi tube 70/170, the minimum cross-sectional area differs from the maximum cross-sectional area by 25% to 75%.

Figure 6:
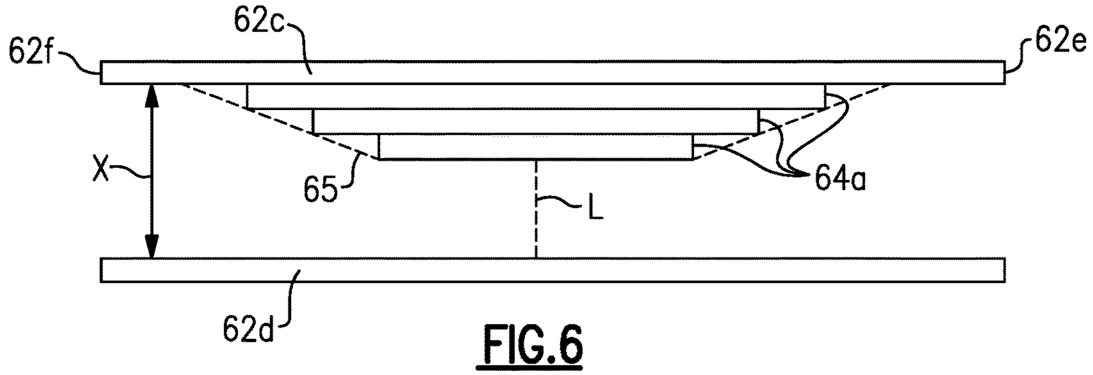
FIG. 6 illustrates a varying wall thickness on one side of the airfoil.
Figure 7:
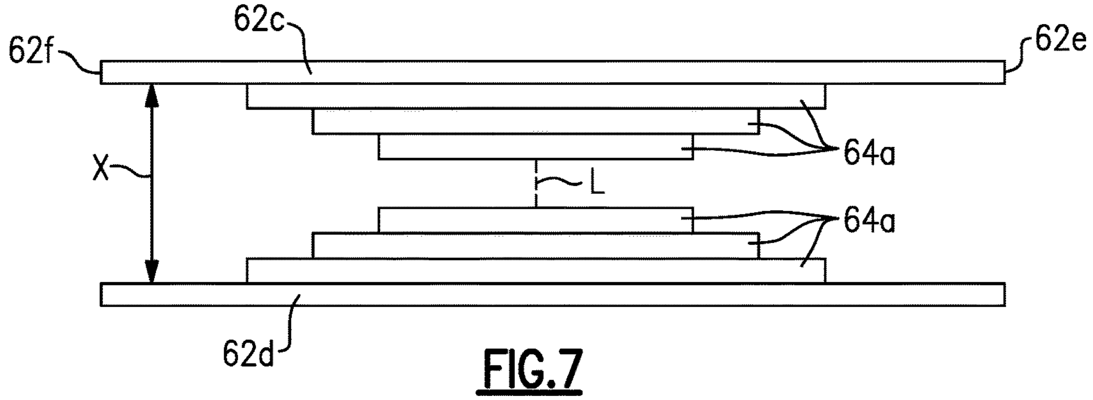
FIG. 7 illustrates a varying wall thickness on both sides of the airfoil.

As shown in FIG. 6, the thickness of only one of the side walls 62$c$ or 62$d$ may vary or, as shown in FIG. 7, the thickness of both side walls 62$c$ and 62$d$ may vary. In each case, however, the ceramic fiber plies 64$a$ are used to locally build-up the thickness. As the edges of the plies 64$a$ may result in a somewhat rough or stepped surface, an additional ceramic fiber ply 65 (FIG. 6) may be provided as an internal "skin" layer over the built-up plies to smooth out the surface.

Figure 8:
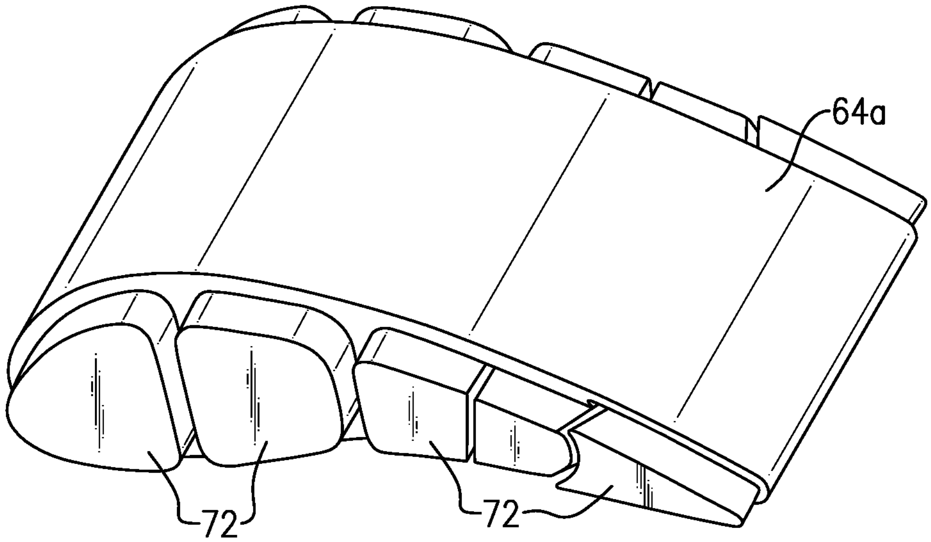
FIG. 8 illustrates a method of forming an airfoil using mandrels.

Also disclosed is a method of forming the airfoil 60. As shown in FIG. 8, fiber plies 64$a$ are laid-up around a plurality of mandrels 72. The mandrels may be formed of polymer via 3-D printing or graphite. For instance, one or more layers of the fiber plies 64$a$ are laid-up around each mandrel 72 in a braiding process, and then one or more external skin layers are laid-up around the mandrels 72 to form the peripheral shape of the airfoil 60.

Figure 9:
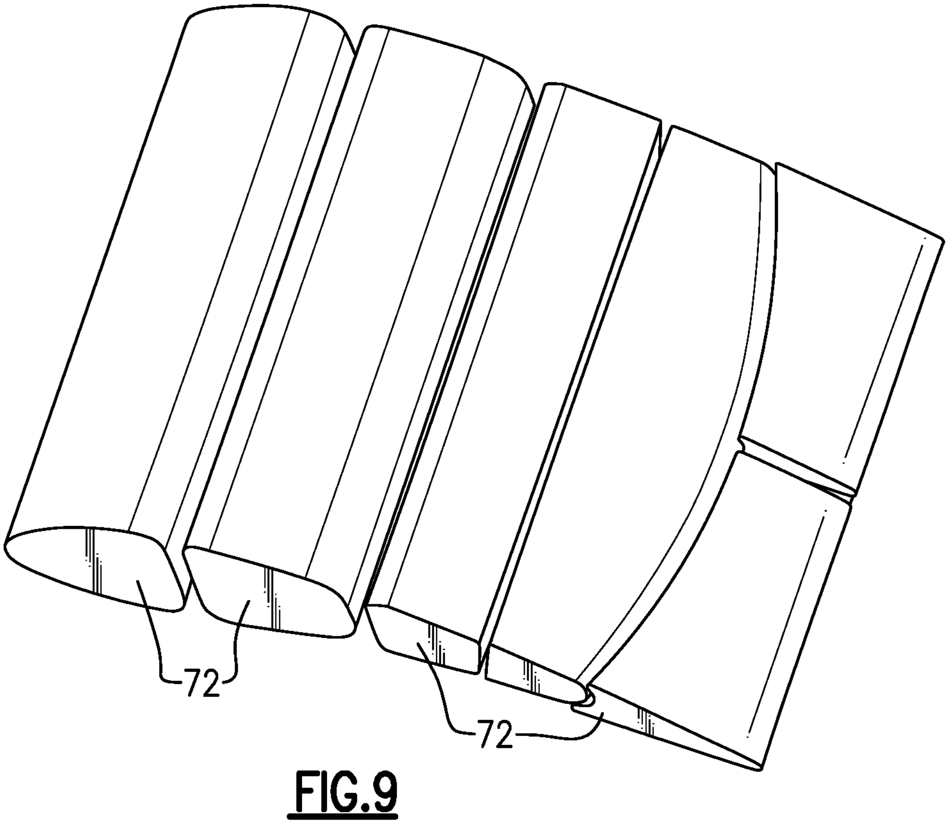
FIG. 9 illustrates a view of the mandrels.

FIG. 9 illustrates the mandrels 72 without the fiber plies 64$a$. The aft-most mandrel that forms the shape of the venturi tube 70 is radially split. The radial split permits the two mandrel pieces to be removed radially. In contrast, if the mandrel was one piece it could not be removed because neither of the larger ends would fit through the narrow region. After lay-up, the mandrels may be removed and then the fiber preform subjected to densification with the matrix material. As an example, the densification may include, but is not limited to, chemical vapor deposition. After densification, the densified airfoil may be subjected to one or more machining processes to achieve the final geometry.

Figure 10:
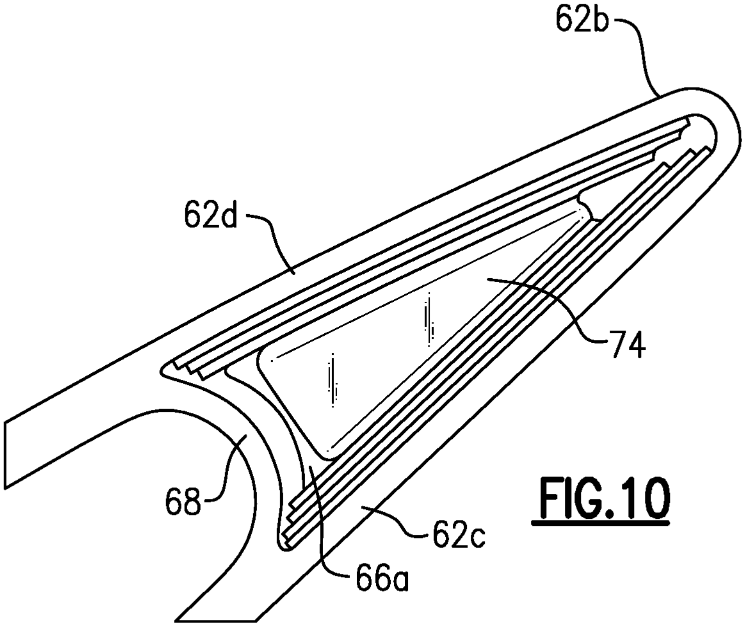
FIG. 10 illustrates a support shim in an airfoil preform.
Figure 11:
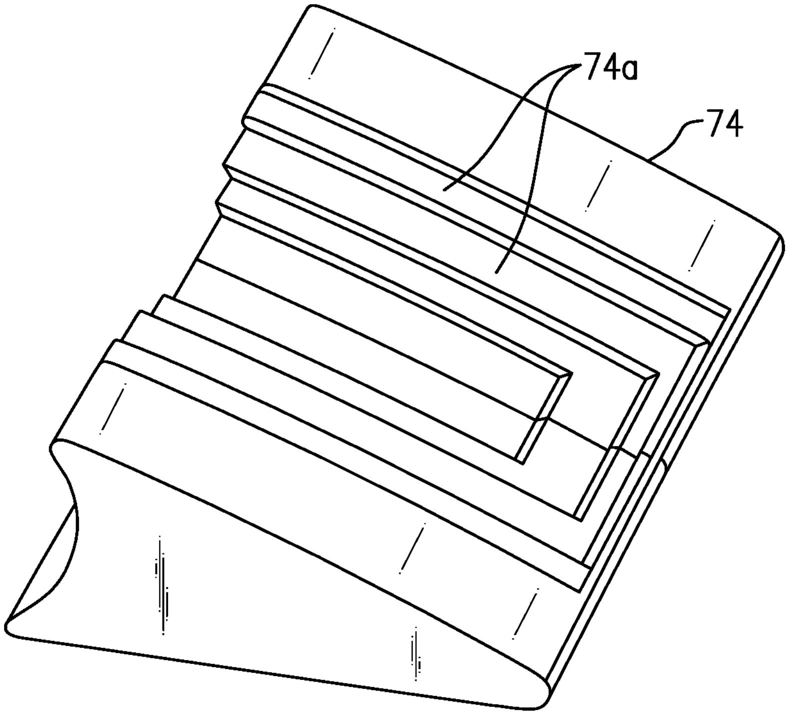
FIG. 11 illustrates the support shim.

Alternatively, to facilitate forming the venturi tube 170, a support shim 74 may be provided in the sub-cavity 66$a$, as shown in FIG. 10. The support shim 74 is shown in an isolated view in FIG. 11 and includes recesses 74$a$ that are of complementary geometry to the geometry of the built-up plies used to vary the thickness of the airfoil wall 62. That is, the recesses 74$a$ form a negative cavity into which the built-up plies nest. The support shim 74 may be to prevent collapse of the airfoil wall around the first sub-cavity 66$a$ during formation of the preform while laying up fiber plies, during densification, or both.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method comprising:

forming an airfoil, the airfoil including an airfoil wall that has a span between first and second radial ends and defines leading and trailing edges, pressure and suction sides each join the leading and trailing edges, and an internal cavity, the internal cavity is divided into at least first and second sub-cavities that extend over the span, and the first sub-cavity defines a venturi tube, the forming including i) fabricating a fiber preform of the airfoil around a plurality of mandrels, wherein the mandrel in the first sub-cavity is radially split, and ii) densifying the fiber preform with a ceramic matrix, wherein the venturi tube has a convergent-divergent geometry such that a cross-sectional area of the venturi tube decreases from the first radial end to a location along the span at which the cross-sectional area is at a minimum and the cross-sectional area increases from the location of the minimum to the second radial end, the forming including forming the airfoil wall from ceramic fiber plies that locally build-up a thickness of at least one of the pressure or suction sides of the airfoil wall at the location of the minimum such that the venturi tube tapers in a tangential direction along the span from the first radial end to the location of the minimum and expands in the tangential direction along the span from the location of the minimum to the second radial end.

2. The method as recited in claim 1, wherein the forming includes using a support shim in the first sub-cavity during densification to prevent collapse of the airfoil wall around the first sub-cavity.

3. The method as recited in claim 1, wherein the cross-sectional area of the venturi tube is bound by a rib, the trailing edge, and the pressure and suction sides of the airfoil wall.

4. The method as recited in claim 1, wherein the ceramic fiber plies locally build-up the thickness of both of the pressure and suction sides of the airfoil wall at the location of the minimum.

5. The method as recited in claim 1, wherein the ceramic fiber plies locally build-up the thickness of only one of the pressure or suction sides of the airfoil wall at the location of the minimum.

* * * * *